UNITED STATES PATENT OFFICE.

FREDERICK R. FARWELL AND FOSTER P. RHINES, OF WATERTOWN, NEW YORK.

BARLEY-FLAKES.

SPECIFICATION forming part of Letters Patent No. 390,849, dated October 9, 1888.

Application filed February 25, 1888. Serial No. 265,303. (No specimens.)

*To all whom it may concern:*

Be it known that we, FREDERICK R. FARWELL and FOSTER P. RHINES, citizens of the United States, residing at Watertown, in the county of Jefferson and State of New York, have invented a certain new and useful article termed "Barley-Flakes;" and we do hereby declare the following to be a full, clear, and exact description of the invention, such as will enable others skilled in the art to which it appertains to make and use the same.

Our invention relates to an improved article of manufacture for culinary purposes, and more especially for domestic use generally and invalid diet; and it consists in the article hereinafter described, and definitely claimed.

The process of preparing the above article we have made the subject of a separate application for Letters Patent, filed simultaneously herewith, Serial No. 265,304.

The object of our invention is to provide a product made from the heart of the kernel of the ordinary barley of commerce, which will be especially applicable for domestic use and invalid diet, and which will possess the advantages of being readily and quickly cooked and prepared for use with but little trouble and expense.

To prepare the barley in a manner resulting in the above-mentioned advantages, we first thoroughly cleanse the grain by dry process—such as winnowing, &c.—and thus free it from all foreign substance. When the grain has been thoroughly cleaned, the outer coating or shell is taken off by subjecting it to the action of grinding-stones or emery-rolls. The outer coating is thus entirely removed, leaving the hearts of the kernels in their original condition and free from all bran or irritants, the expulsion of the bran and hulls and their separation from the hearts of the kernels being accomplished by suitable blasts. The hearts of the barley-kernels, after being thus relieved of all indigestible substance, are then subjected to the action of rolls or pressers, and each individual kernel is pressed into thin wafers or flakes. In this condition the flakes are quickly soaked and readily cooked and make a nutritious article, entirely free from all hard lumps and foreign matter.

It will be observed that in forming our improved article we dispense with the use of all moisture, which would tend to harden the flakes and absorb dust and foreign matter, thereby rendering the article injurious to health and less easily cooked and prepared for use.

Having thus fully described our invention, what we claim as new, and wish to secure by Letters Patent, is—

As a new article of manufacture, the hearts of barley-kernels in their natural dry condition, freed from irritants and pressed into flakes, substantially as described.

In testimony whereof we affix our signatures in presence of two witnesses.

FREDERICK R. FARWELL.
FOSTER P. RHINES.

Witnesses:
W. W. RICE,
F. R. HUNTINGTON.